(12) United States Patent
Yunokawa et al.

(10) Patent No.: US 6,412,156 B1
(45) Date of Patent: Jul. 2, 2002

(54) MULTI-SPINDLE MACHINE TOOL

(75) Inventors: Yoshio Yunokawa, Toyota; Satoru Uemura, Kariya; Toshihiro Asakura, Chiryu, all of (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/574,260

(22) Filed: May 19, 2000

(30) Foreign Application Priority Data

May 21, 1999 (JP) ............................................ 11-142137

(51) Int. Cl.⁷ ............................ B23Q 5/22; B23B 39/16; B23C 1/04
(52) U.S. Cl. ...................... 29/53; 29/50; 29/55; 408/42; 408/46; 409/203; 409/217
(58) Field of Search ................................. 29/50, 53, 55, 29/40, 564; 408/42, 46, 53, 35, 51, 43; 409/217, 213, 203

(56) References Cited

U.S. PATENT DOCUMENTS

| | | | |
|---|---|---|---|
| 3,546,978 A | * 12/1970 | Keown | 408/42 X |
| 3,822,958 A | * 7/1974 | Lewis | 408/46 |
| 4,123,191 A | * 10/1978 | Braun | 408/42 |
| 4,198,181 A | * 4/1980 | Smelser | 408/46 X |
| 4,400,120 A | * 8/1983 | Eberle | 408/51 X |
| 4,419,803 A | * 12/1983 | Thornton et al. | 29/564 X |
| 4,596,717 A | * 6/1986 | Herbert et al. | 408/42 X |
| 4,850,754 A | * 7/1989 | Thornton et al. | 408/35 |
| 4,917,548 A | * 4/1990 | Ruff | 408/42 X |

FOREIGN PATENT DOCUMENTS

| | | | |
|---|---|---|---|
| FR | 1469870 | * 1/1967 | 408/53 |
| GB | 1575902 | * 10/1980 | 408/42 |
| JP | 55-21835 | 2/1980 | |
| JP | 0102612 | * 6/1983 | 408/42 |
| JP | 166911 | * 7/1987 | 408/53 |
| SU | 670391 | * 6/1979 | 408/53 |

* cited by examiner

*Primary Examiner*—William Briggs
(74) *Attorney, Agent, or Firm*—Oblon, Spivak, McClelland, Maier & Neustadt, P.C.

(57) ABSTRACT

In a multiple spindle processing unit which can change processing locations of a work in accordance with a modification made to the work, the present invention is intended to facilitate changes of design corresponding to the modification made to the work and reduce the number of parts to be replaced. In a frame member which is guided and supported so as to be moved towards and away from a work, insertion holes are formed at a plurality of locations corresponding to processing locations of the work. In each of a plurality of tool main spindle assemblies, a main spindle having a front end portion where a chuck for mounting a tool is provided is coaxially journaled in a housing in the shape of a circular cylinder or a polygonal cylinder and is rotationally driven by a built-in motor. Each of the tool main spindle assemblies is mounted to the frame member with the housing inserted through the insertion hole. The tool main spindle assembly may be mounted to the frame member through a holding plate which is divided into a plurality of portions for securely sandwiching the housing or through a flange which is integrated with the housing and which protrudes radially.

5 Claims, 8 Drawing Sheets

MULTI-SPINDLE MACHINE TOOL

INCORPORATION BY REFERENCE

The disclosure of Japanese Patent Application No. 11-142137 filed on May 21, 2000 including the specification, drawings and abstract is incorporated herein by reference in its entirety.

BACKGROUND OF THE INVENTION

1. Field of the Invention

The present invention relates to a multiple spindle processing unit for simultaneously processing a plurality of processing locations of a work.

2. Description of the Related Art

As an example of such a multiple spindle processing unit, Japanese Utility Model Publication No. HEI 55-21835 discloses a multiple spindle head wherein a plurality of cylindrical housings journaling tool main spindles are removably secured to a case so as to easily contend with a modification made to a work. In this multiple spindle head, an end of a drive shaft journaled in a body for securing the case to an opening end surface is connected to ends of the tool main spindles by means of gears, and all the tool main spindles are driven by a single motor.

This multiple spindle head makes it possible to contend with a modification made to a work by arranging the housings journaling the tool main spindles at positions corresponding to processing locations of the work. However, a great deal of labor and craftsmanship are required to arrange the gears and determine the number of gears such that the tool main spindles arbitrarily arranged in accordance with the processing locations of the work are driven in a desired rotational direction and at a desired rotational speed. Further, such a modification leads to problems such as an increase in the number of required parts, complication of assembly operations, a resultant increase in costs, and undesirable maintainability. Outwardly extending flanges are formed at openings of the housings. The housings are fastened at the flanges to the case by means of bolts. Therefore, the minimum distance among the tool main spindles cannot be reduced beyond a certain limit, and in some cases, it is impossible to handle a work whose processing locations are close to one another.

SUMMARY OF THE INVENTION

It is an object of the present invention to solve such problems. According to the present invention, there is provided a multiple spindle processing unit comprising a housing, a main spindle which is coaxially and rotationally journaled by the housing and which has a front end portion where a chuck for mounting a tool is provided, a plurality of tool main spindle assemblies each composed of a built-in motor which is built into the housing to rotationally drive the main spindle, and a frame member which is guided and supported so as to be moved towards or away from a work and which has insertion holes for removably mounting the tool main spindle assemblies at a plurality of locations corresponding to a plurality of processing locations of the work. The built-in motors for rotationally driving the main spindles are built into the housings correspondingly. Therefore, in order to change arrangement of the main spindles in response to a change in processing locations of the work, it is required just to replace the insertion holes formed in the frame member with those corresponding to the processing locations of the work and rearrange the tool main spindle assemblies journaling the main spindles.

The multiple spindle processing unit may further comprise a holding plate which is divided into a plurality of portions and which securely sandwiches the housing of each of the tool main spindle assemblies. The tool main spindle assembly may removably be mounted to the frame member through the holding plate with the housing inserted through the insertion hole. This construction makes it possible to arrange the tool main spindle assemblies very close to one another.

Furthermore, in the multiple spindle processing unit, a flange may integrally be formed to radially protrude from an outer peripheral surface of the housing of each of the tool main spindle assemblies, and the tool main spindle assembly may removably be mounted to the frame member through the flange with the housing inserted through the insertion hole. This construction dispenses with a separate holding plate.

In the multiple spindle processing unit, some of the tool main spindle assemblies may be mounted to the frame member with the flange in close contact with one side surface of the frame member, and the other tool main spindle assemblies may be mounted to the frame member with the flange in close contact with the other side surface of the frame member. In this case, the flanges located on opposed sides of the frame member do not interfere with each other.

In the multiple spindle processing unit, the flange may be formed to protrude from the housing on diametrically opposed sides. In this construction, the width of the flange can be reduced in the direction perpendicular to the direction in which the flange protrudes.

BRIEF DESCRIPTION OF THE DRAWINGS

The foregoing and further objects, features and advantages of the present invention will become apparent from the following description of preferred embodiments with reference to the accompanying drawings, wherein.

DESCRIPTION OF PREFERRED EMBODIMENTS

Figure 1:
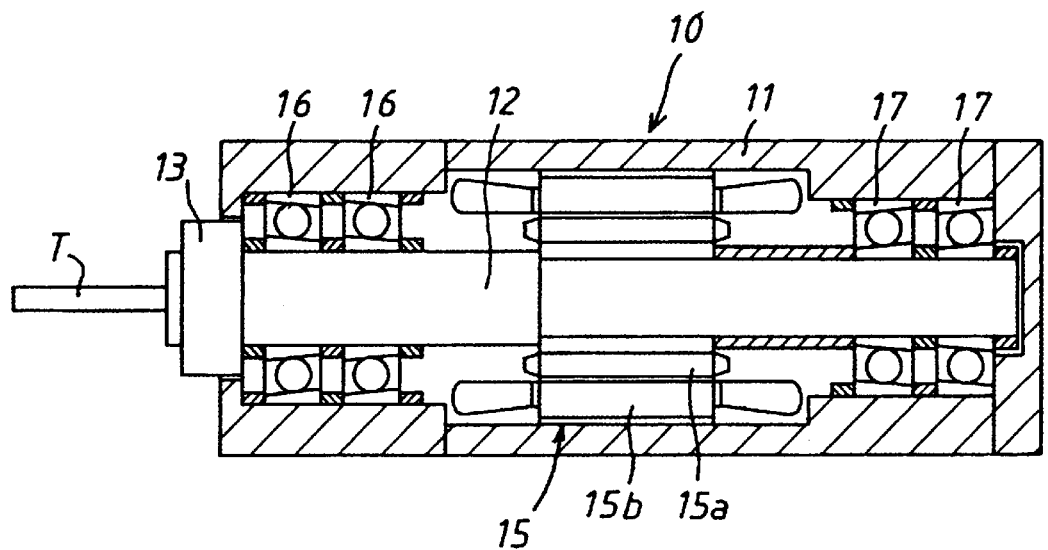
FIG. 1 is a longitudinal cross-sectional view of the overall structure of a tool main spindle assembly employed in a multiple spindle processing unit in accordance with first through third embodiments of the present invention.

First of all, a multiple spindle processing unit in accordance with a first embodiment of the present invention will be described with reference to FIGS. 1 through 4. As mainly shown in FIG. 4, a frame member 25 is slidably guided and supported on a bed 20 in a direction X in which the frame member 25 is moved towards or away from a work (not shown) through a slide 21. The frame member 25 supports five tool main spindle assemblies 10 aligned laterally. The frame member 25 is reciprocated by a ball screw 26 and a nut (not shown) into which the ball screw 26 is screwed. The ball screw 26 is supported by the bed 20 in a manner exclusively allowing rotational movements and is rotationally driven by a motor 27. The nut is provided on a lower surface of the frame member 25.

As mainly shown in FIG. 1, each of the tool main spindle assemblies 10 has a cylindrical housing 11 into which a plurality of parts are integrated. A main spindle 12 is rotatably journaled to be coaxial with a housing through ball bearings 16, 17. The ball bearings 16, 17 are provided at opposed end portions of the main spindle 12. A chuck 13, which removably holds a tool T, is coaxially mounted to a front end of the main spindle 12 protruding from one end of the housing 11. The main spindle 12 is rotationally driven by a built-in motor 15 that is built into the housing 11. The built-in motor 15 is composed of a rotor 15A fixed to the main spindle 12 and a stator 15b fixed to the housing 11.

Figure 3:
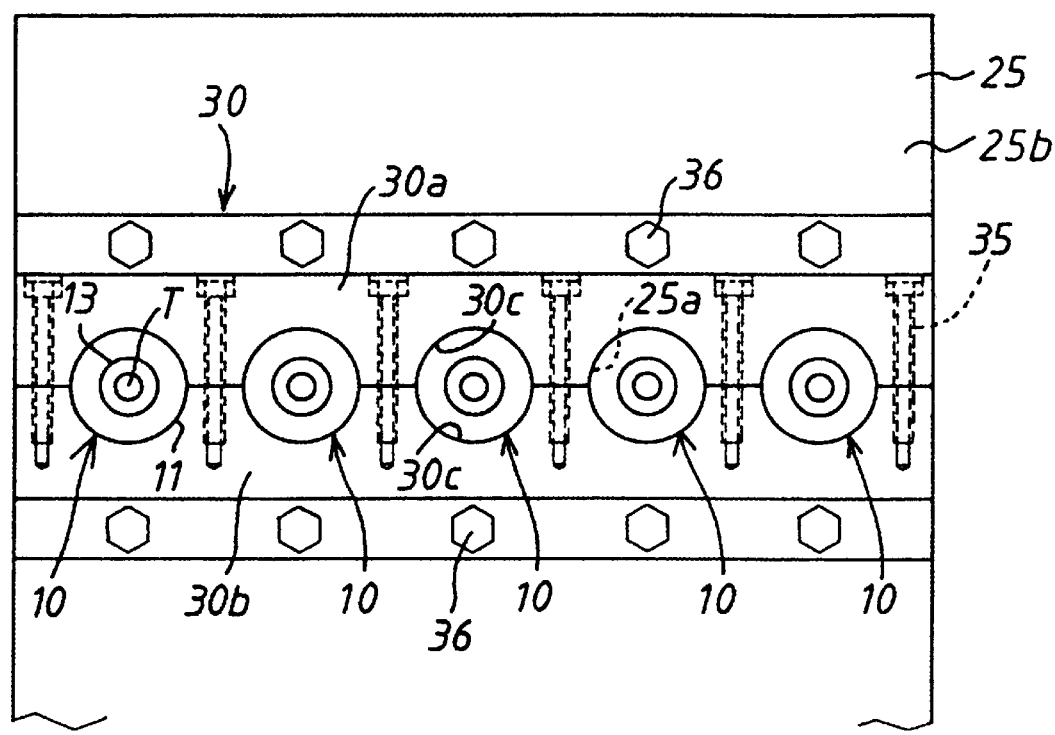
FIG. 3 is a left side view of FIG. 2.
Figure 2:
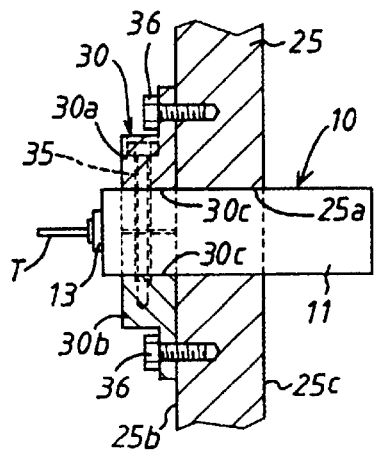
FIG. 2 is a cross-sectional view of the structure for mounting the tool main spindle assembly to a frame member in the multiple spindle processing unit in accordance with the first embodiment of the present invention.
Figure 4:
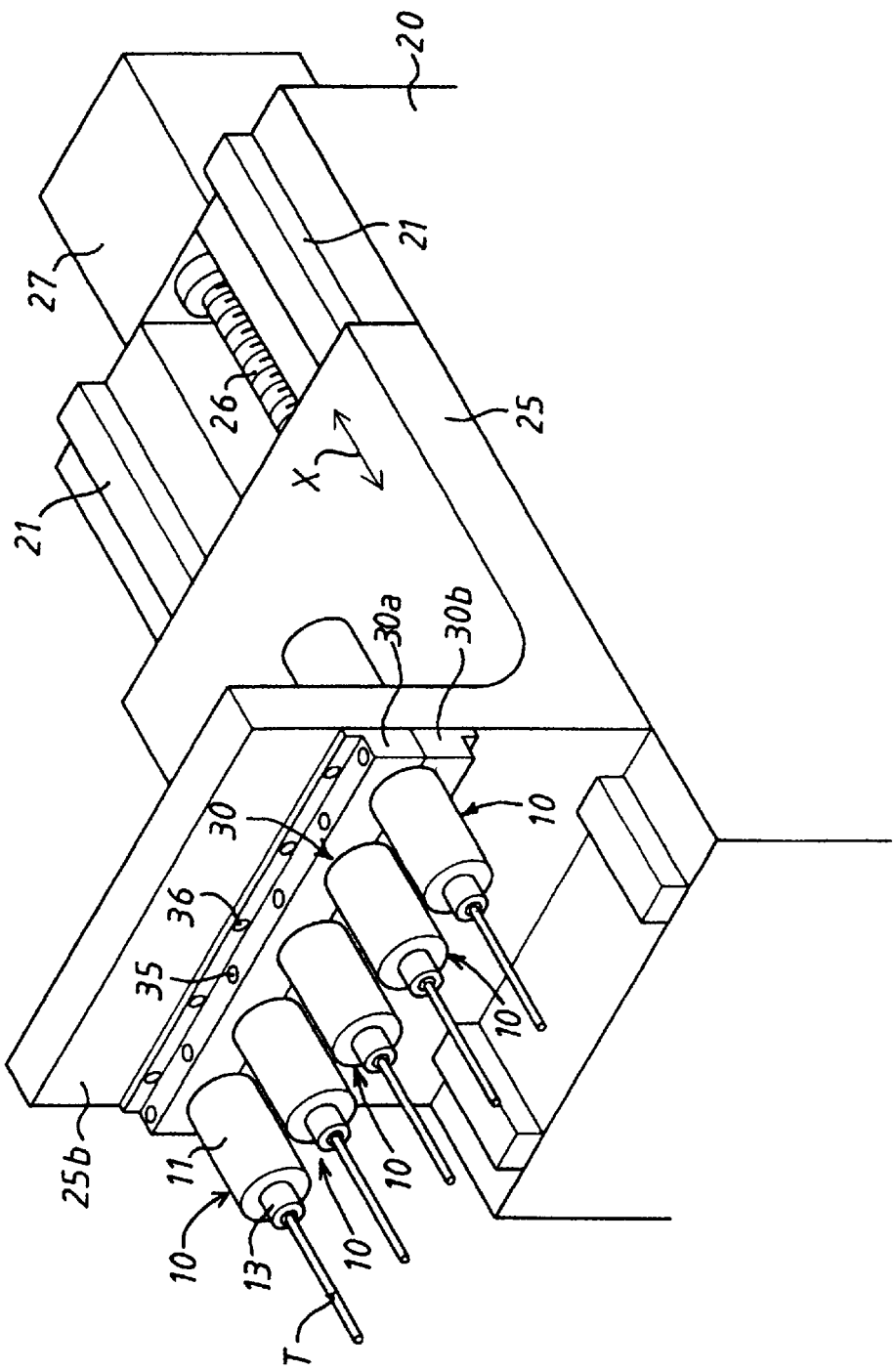
FIG. 4 is a perspective view of the overall structure of the multiple spindle processing unit in accordance with the first embodiment of the present invention.

In each of the tool main spindle assemblies 10, as shown in FIGS. 2 through 4, the housing 11 is inserted through an insertion hole 25A formed in the frame member 25 and is fixed to the frame member 25 through a holding plate 30. In this embodiment, five insertion holes 25A are formed in the work at a plurality of processing locations. The insertion holes 25A are through-holes which are aligned laterally at an equal pitch. The holding plate 30 is composed of a pair of half portions 30a, 30b which are vertically opposed to each other. Five semicircular recesses 30c are formed along a joining edge of each of the half portions 30a, 30b. These recesses 30c receive outer peripheral surfaces of the housings 11 of the tool main spindle assemblies 10 substantially airtightly. The recesses 30c are arranged at the same pitch as the insertion holes 25a. At the outset, the half portions 30a, 30b are integrally coupled to each other. The half portions 30a, 30b are obtained by forming five through-holes substantially identical to the insertion holes 25a in the holding plate 30 and cutting it in halves along a plane passing through center lines of the through-holes by means of a milling cutter or the like.

As shown in FIGS. 2 through 4, the tool main spindle assemblies 10 are securely sandwiched between the half portions 30a, 30b of the holding plate 30. This state is realized by fitting the outer peripheral surfaces of the housings 11 onto inner peripheral surfaces of the recesses 30c, joining the housings 11 to the half portions 30a, 30b, and tightening clamping bolts 35 which are provided between the recesses 30c and at opposed end portions. A cutting allowance generated in cutting the holding plate 30 with the aforementioned milling cutter or the like constitutes an interference in securely sandwiching the tool main spindle assemblies 10 between the half portions 30a, 30b. Each of the tool main spindle assemblies 10 is securely sandwiched between the half portions 30a, 30b of the holding plate 30 with the housing 11 inserted through the insertion hole 25a in the frame member 25, and is removably mounted to the frame member 25 by clamping the holding plate 30 by means of a mounting bolt 36. Although the tools T shown FIGS. 3 and 4 are similar to one another, they actually correspond to processing locations of the works. Each of the tool main spindle assemblies 10 protrudes from the frame member 25 by a distance that differs depending on a processing location of the work.

The tool main spindle assemblies 10 may securely be sandwiched between the half portions 30a, 30b of the holding plate 30 before the housings 11 are inserted through the insertion holes 25a. That is, the housings 11 may be inserted through the insertion holes 25a after the tool main spindle assemblies 10 have securely been sandwiched between the half portions 30a, 30b of the holding plate 30, so as to securely clamp the holding plate 30 onto the frame member 25 by means of mounting bolts 36. In this case, if the precision in processing the half portions 30a, 30b is enhanced, works can be processed with required precision even in the case where the insertion holes 25a formed in the frame member 25 are rough and large.

The tool main spindle assemblies 10 thus fixed to the frame member 25 process a work at various locations by rotationally driving the main spindles 12 and the tools T by means of the built-in motors 15 and advancing the frame member 25 towards the work by means of the motors 27.

In the case where arrangement of the main spindles 12 is modified in response to a change of processing locations of a work, the first embodiment only requires replacing the insertion holes 25a formed in the frame member 25 and the holding plate 30 with those corresponding to the processing locations of the work and changing arrangement of the tool main spindle assemblies 10 journaling the main spindles 12. Therefore, the multiple spindle processing unit can easily be designed in accordance with such a change. The number of additional parts required by such a change is comparatively small. If one of the tool main spindle assemblies 10 is out of order, it is required just to exchange that tool main spindle assembly 10 independently of the other ones. Therefore, it is easy to provide maintenance for the multiple spindle processing unit. The housings 11 are not required to take the shape of a circular cylinder. For example, the housings 11 may be in the shape of a polygonal cylinder. In this case, the housings 11 assume such a shape that the recesses 30c in the half portions of the holding plate 30 receive the outer peripheral surfaces of the housings 11 of the tool main spindle assemblies 10 substantially air tightly.

Figure 5:
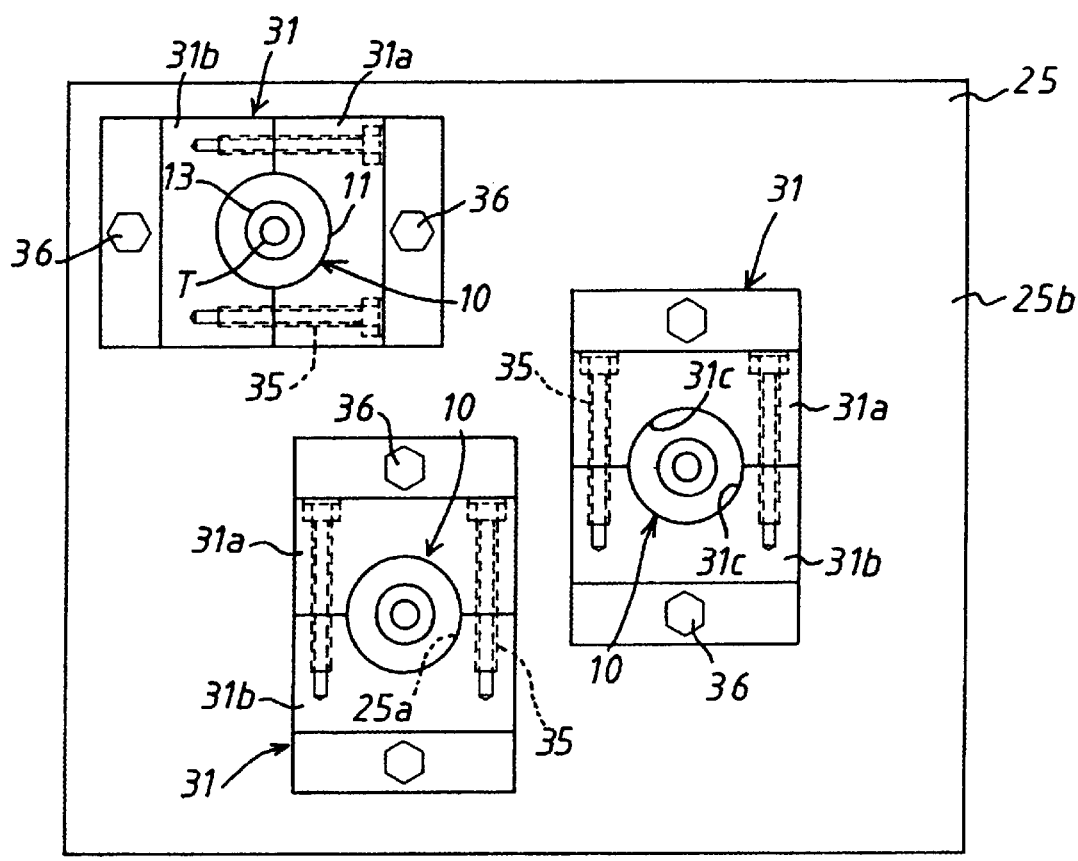
FIG. 5 is a side view similar to FIG. 3 and shows the multiple spindle processing unit in accordance with the second embodiment of the present invention.

Next, a second embodiment of the present invention will be described with reference to FIG. 5. The second embodiment is different from the first embodiment only in the following respects. That is, the insertion holes 25a formed in the frame member 25 (only one reference numeral is shown in FIG. 5) are arranged triangularly in accordance with processing locations of a work. A holding plate 31 is provided separately for each of the insertion holes 25a, and one tool main spindle assembly 10 is securely sandwiched between half portions 31a, 31b of the holding plate 31 and removably mounted to the frame member 25. In other respects, the construction of the second embodiment is identical to that of the first embodiment. Therefore, components of the second embodiment identical to those of the first embodiment are denoted by the same reference numerals and will not be described in detail. The second embodiment only requires changing the frame member 25 when modifications are made to a work. That is, the holding plates 31 are commonly used despite such modifications made to the work. Thus, in the second embodiment, the number of parts required for such modifications is further reduced.

In the second embodiment, the holding plates 31 are mounted to one side surface of the frame member 25 opposed to a work (see one side surface 25b in FIG. 2). However, it is also possible to mount some of the holding plates 31 to one side surface opposed to the work and the other holding plates 31 to the other side surface of the frame member 25 (see the other side surface 25c in FIG. 2). In the case where all the holding plates 31 are mounted to one side surface 25b of the frame member 25, the holding plates 31 cannot be arranged to overlap with one another because they interfere with one another. However, in the case where the holding plates are mounted to both one side surface 25b and the other side surface 25c of the frame member 25, the holding plates 31 mounted to one side surface of the frame member 25 do not interfere with the holding plates 31 mounted to the other side surface of the frame member 25. The holding members 31 can be arranged to overlap with each other with the frame member 25 interposed therebetween. This makes it possible to arrange the tool main spindle assemblies 10 to such an extent that they come into close contact with the holding plates 31 on the opposite side surface. Therefore, the tool main spindle assemblies 10 supported by the holding plates 31 on the opposite side of the frame member 25 can be located closer to one another in comparison with the case where all the holding plates 31 are mounted to one side surface of the frame member 25. That is, it is possible to locate the tool main spindle assemblies 10 close to one another and handle a work whose processing locations are close to one another.

Figure 6:
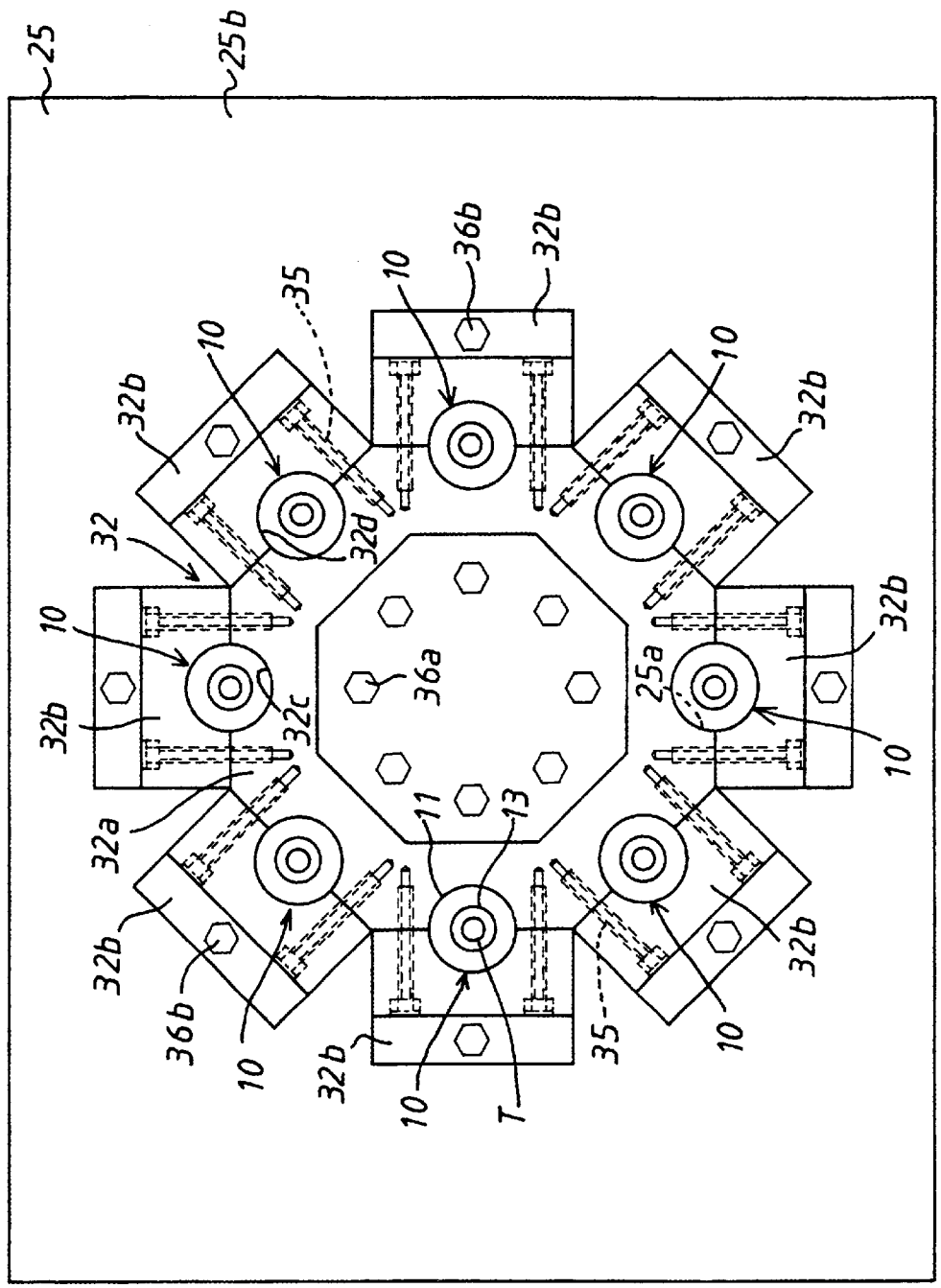
FIG. 6 is a side view similar to FIG. 3 and shows the multiple spindle processing unit in accordance with the third embodiment of the present invention.

In a third embodiment of the present invention shown in FIG. 6, the insertion holes 25a formed in the frame member 25 (only one reference numeral is shown in FIG. 6) are arranged in the shape of an equilateral octagon in accordance with processing locations of a work. A holding plate 32 is composed of a common body portion 32a and eight clamp portions 32b. The body portion 32a is in the shape of an equilateral octagon with eight sides each having a recess 32c. The eight recesses 32c respectively correspond to the insertion holes 25a formed in the frame member 25. Each of the clamp portions 32b has a recess 32d corresponding to the recess 32c. The outer peripheral surfaces of the housings 11 are brought into close contact with the recesses 32c in the body portion 32a and the recesses 32d in the clamp portions 32b, and the clamp portions 32b are tightened by means of the clamping bolts 35. Thereby the tool main spindle assemblies 10 are securely sandwiched between the body portion 32a and the clamp portions 32b, and the holding plate 32 is removably mounted to the frame member 25 by means of mounting bolts 36a, 36b. In other respects, the construction of the third embodiment is identical to that of the first embodiment. Therefore, components of the third embodiment identical to those of the first embodiment are denoted by the same reference numerals and will not be described in detail.

Figure 7:
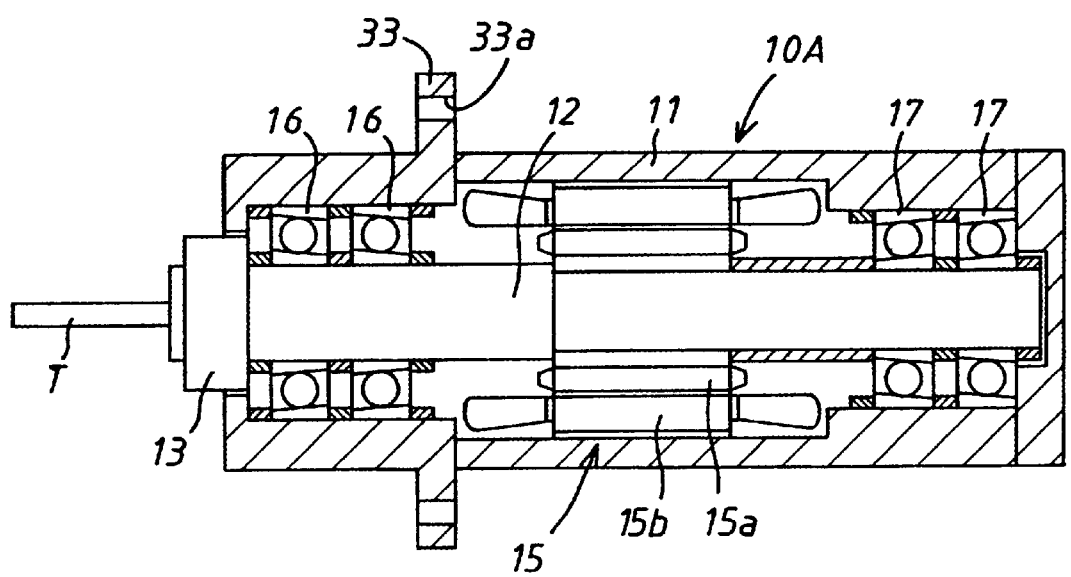
FIG. 7 is a longitudinal cross-sectional view of the overall structure of a tool main spindle assembly employed in a multiple spindle processing unit in accordance with a fourth embodiment of the present invention.
Figure 9:
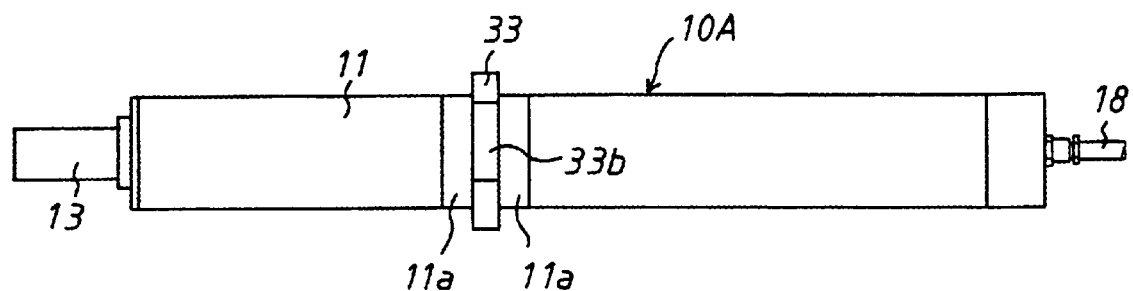
FIG. 9 is a side view of a tool main spindle assembly employed in a multiple spindle processing unit in accordance with a fifth embodiment of the present invention.
Figure 8:
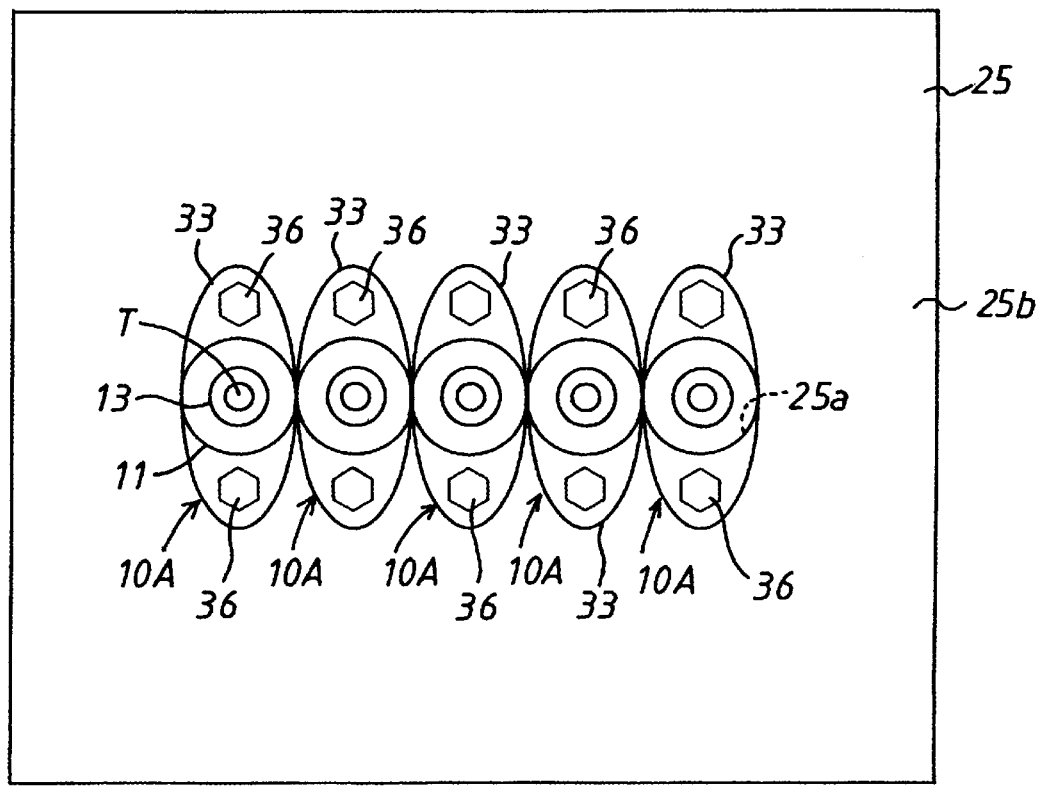
FIG. 8 is a side view similar to FIG. 3 and shows the fourth embodiment shown in FIG. 7.

Next, a fourth embodiment of the present invention will be described with reference to FIGS. 7 and 8. A tool main spindle assembly 10a of the third embodiment is identical to the tool main spindle assembly 10 of the first embodiment except that a generally elliptical flange 33 is integrally formed to protrude from the outer peripheral surface of an intermediate portion of the housing 11 in radially opposed directions, namely, to protrude on diametrically opposed sides. The minor axis of the generally elliptical flange 33 is as long as the diameter of the housing 11. A pair of mounting holes 33a are formed in the flange 33.

The tool main spindle assembly 10a is removably mounted to the frame member 25 by inserting the housing 11 through the insertion hole 25a and fastening the housing 11 with screws screwed into the mounting holes 33a of the flange 33. In other respects, the construction of the fourth embodiment is identical to that of the first embodiment. Therefore, components of the fourth embodiment identical to those of the first embodiment are denoted by the same reference numerals and will not be described in detail.

This embodiment dispenses with a separate holding plate 30 and thus further reduces the number of required parts. In the direction perpendicular to the direction in which the generally elliptical flange 33 protrudes on diametrically opposed sides, the flange 33 does not protrude from the outer peripheral surface of the housing 11. Thus, in that direction, the tool main spindle assemblies 10a can be located close to one another to such an extent that the outer peripheral surfaces of the housings 11 come into direct contact with one another. For this reason, the fourth embodiment makes it possible to handle a work whose processing locations are extremely close to one another. The amounts by which the tools T protrude from the frame member 25 are adjusted by preparing a plurality of different tool main spindle assemblies 10a with flanges 33 which are axially differently located with respect to the housings 11 and changing amounts by which the tools T protrude from the chucks 13.

Figure 10:
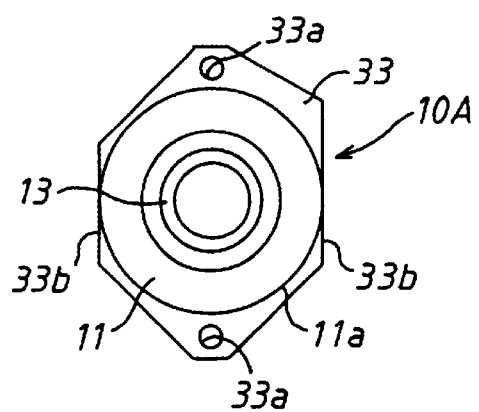
FIG. 10 is a front view of FIG. 9.
Figure 11:
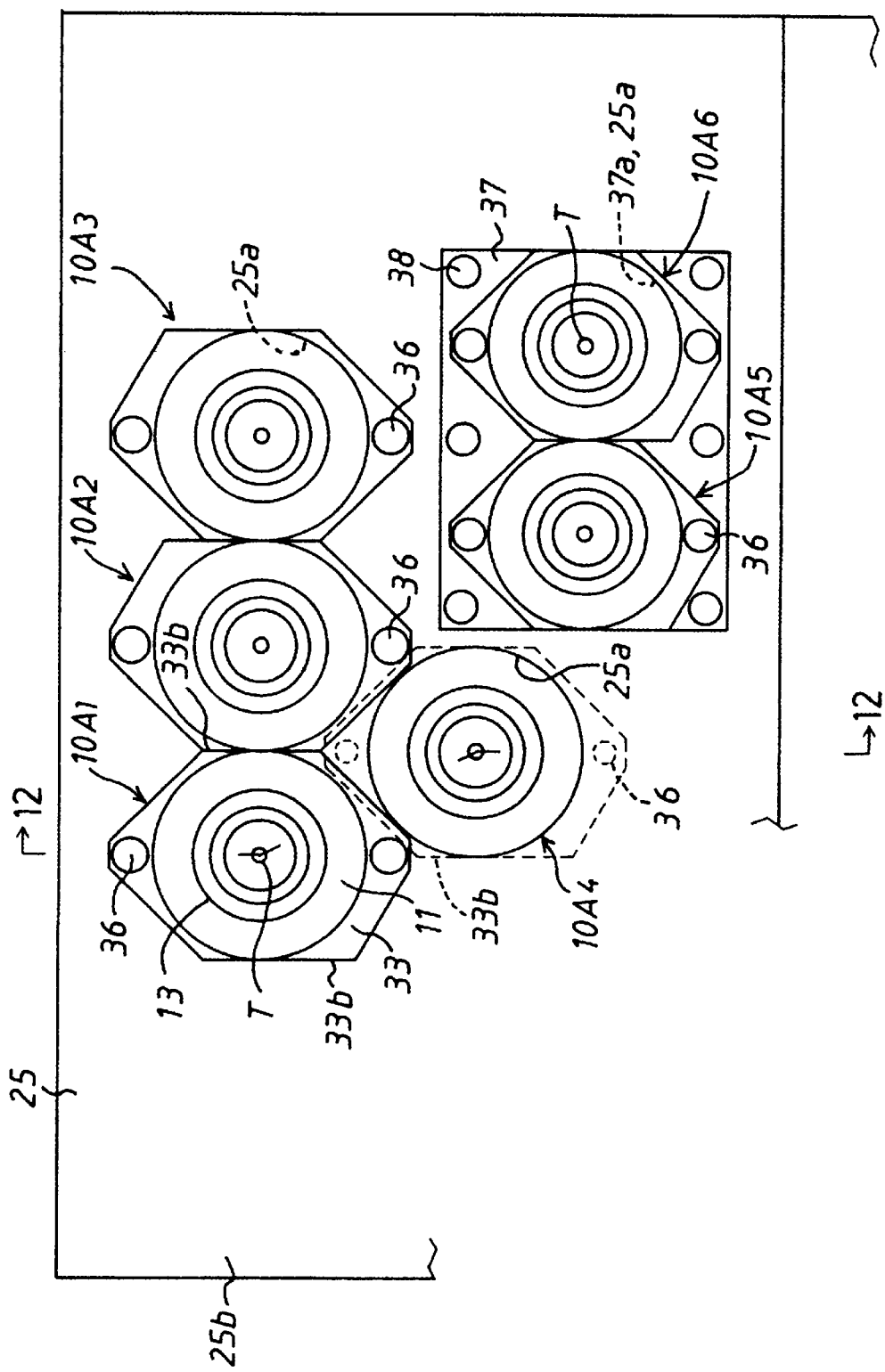
FIG. 11 is a side view similar to FIG. 3 and shows the multiple spindle processing unit in accordance with the fifth embodiment of the present invention.

In a fifth embodiment of the present invention shown in FIGS. 9 through 12, there is a flange 33 protruding from the outer peripheral surface of the housing 11 of the tool main spindle assembly 10a. However, the flange 33, the shape in the neighborhood of the flange 33, and the manner in which the tool main spindle assembly 10a is mounted to the frame member 25 are different from those of the fourth embodiment shown in FIGS. 7 and 8. Also in the fifth embodiment, the housing 11 of the tool main spindle assembly 10a is in the shape of a circular cylinder. However, fitting surfaces 11a are formed on the outer peripheral surface of the flange 33 on axially opposed sides, and outer peripheral surfaces of the flange 33 located outwardly of the fitting surfaces 11a are slightly smaller in diameter than the fitting surfaces 11a. The fitting surfaces 11a are located with respect to the insertion holes 25a in a relation of clearance fit which is similar to transit fit. As shown in FIGS. 10 and 11, the flange 33 of the fifth embodiment is generally in the shape of a sexangle and has a pair of flat portions 33b. The flat portions 33b are parallel to each other and in contact with the fitting surface 11a as viewed in the axial direction. Mounting holes 33a are formed in portions of the flange 33 which protrude on diametrically opposed sides. A chuck 13 and a feeder line 18 for the built-in motor are provided at front and rear ends of the tool main spindle assembly 10a respectively.

Figure 12:
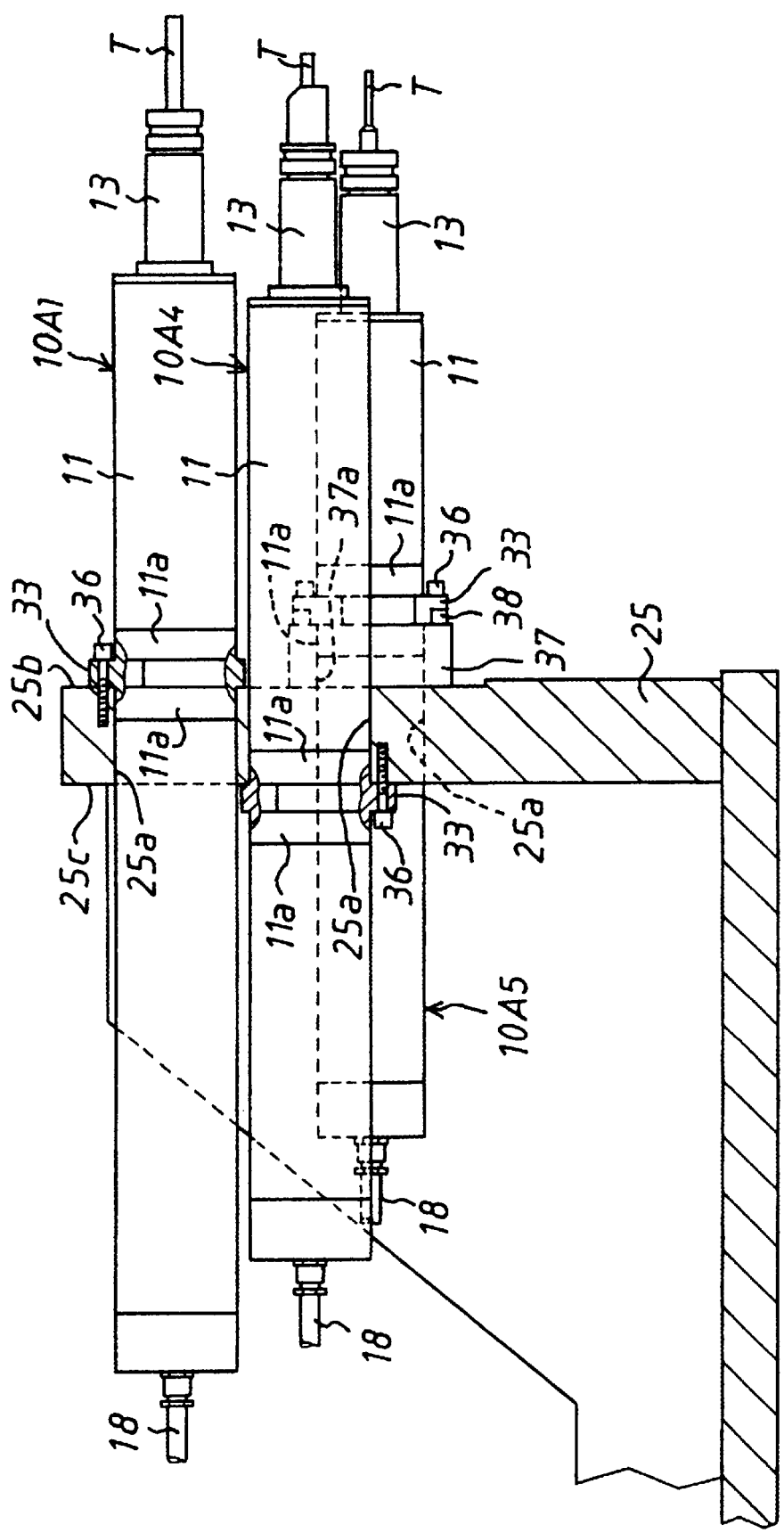
FIG. 12 is a cross-sectional view taken along a line 12—12 in FIG. 11.

In the fifth embodiment, as shown in FIGS. 11 and 12, three upper ones 10A through 10A$_3$ of six tool main spindle assemblies 10A$_1$ through 10A$_6$ are mounted to the frame member 25 in the following manner. That is, the housings 11 are inserted into the insertion holes 25A of the frame members 25 from the side of side surfaces 25b opposed to a work (not shown), and the fitting surfaces 11a are fitted into the insertion holes 25a to be positioned therein. Then, the tool main spindle assemblies 10A$_1$ through 10A$_3$ are mounted to the frame member 25 by means of the mounting bolts 36 with the flanges 33 in close contact with the side surfaces 25b. In an example shown in FIGS. 11 and 12, the tool main spindle assemblies 10A$_1$ through 10A$_3$ are mounted such that the flat portions 33b of the flanges 33 are in close contact with one another. However, it is not obligatory that the flat portions 33b of the flanges 33 be in close contact with one another. Out of three lower tool main spindle assemblies $10A_4$ through $10A_6$, the furthest left one $10A_4$ shown in FIG. 11 is mounted to the frame member 25 in the following manner. That is, the housing 11 is inserted into the insertion hole 25A from the side of the other side surface 25c opposed to one side surface 25b, and the fitting surface 11A is fitted into the insertion hole 25a to be position therein. Then, the tool main spindle assembly $10A_4$ is mounted to the frame member 25 by means of the mounting bolts 36 with the flange 33 in close contact with the other side surface 25c.

While the flanges 33 of the tool main spindle assemblies $10A_1$, $10A_2$ (indicated by solid lines) are mounted to one side surface 25b of the frame member 25, the flange 33 of the tool main spindle assembly $10A_4$ (indicated by a broken line) is mounted to the other side surface 25c. Therefore, the flanges 33 of the tool main spindle assemblies $10A_1$, $10A_2$ do not interfere with the flange 33 of the tool main spindle assembly $10A_4$. Thus, as shown in FIGS. 11 and 12, the tool main spindle assemblies $10A_1$, $10A_2$ and the tool main spindle assembly $10A_4$ can be arranged in an overlapping manner with the frame member 25 interposed therebetween. Thus, the tool main spindle assembly $10A_4$ can be located close to the tool main spindle assemblies $10A_1$, $10A_2$ to such an extent that the outer peripheral surface of the housing 11 comes into close contact with the flanges 33 of the tool main spindle assemblies $10A_1$, $10A_2$ (or to such an extent that the outer peripheral surfaces of the housings 11 of the tool main spindle assemblies $10A_1$, $10A_2$ come into close contact with the flange 33 of the tool main spindle assembly $10A_4$).

That is, the tool main spindle assembly $10A_4$ can be located closer to the tool main spindle assemblies $10A_1$, $10A_2$ in comparison with the case where the tool main spindle assemblies $10A_1$ through $10A_6$ are mounted to only one side surface 25b of the frame member 25. Thus, the fifth embodiment makes it possible to handle a work whose processing locations are close to one another.

The other two lower tool main spindle assemblies $10A_5$, $10A_6$ are smaller than the other ones. As is the case with the tool main spindle assemblies $10A_1$ through $10A_3$, the tool main spindle assemblies $10A_5$, $10A_6$ are mounted altogether to an intermediate block 37. The intermediate block 37 is mounted to one side surface 25b of the frame member 25 by means of mounting bolts 38. Arrangement of the tool main spindle assemblies $10A_1$ through $10A_6$ is determined by positions of the insertion holes 25a formed in the frame member 25.

In the fifth embodiment, the amount by which the tools T protrude from the frame member 25 can be adjusted by changing a thickness of the intermediate block 37.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations that are exemplary, other combinations and configurations, including more, less or only a single embodiment, are also within the spirit and scope of the present invention.

What is claimed is:

1. A multiple spindle processing unit comprising:
   a plurality of tool assemblies, each of said tool assemblies including,
      a housing,
      a main spindle coaxially and rotationally journaled by said housing and provided with a chuck for mounting a tool, and
      a built-in motor built into said housing to rotationally drive said main spindle;
   a frame member guided and supported so as to be moved towards or away from a workpiece, and including insertion holes for removably mounting said tool assemblies at a plurality of locations corresponding to a plurality of processing locations of said workpiece;
   a holding plate which is divided into a plurality of portions and which securely sandwiches a respective housing of each of the tool assemblies, wherein:
   each of said tool assemblies is removably mounted to the frame member through the holding plate with the respective housing inserted through the insertion hole.

2. The multiple spindle processing unit according to claim 1, wherein the housing has an outer shape of a cylinder.

3. The multiple spindle processing unit according to claim 1, wherein:
   a flange is integrally formed to radially protrude from an outer peripheral surface of the respective housing of each of the tool assemblies; and
   each of said tool assemblies is removably mounted to the frame member through the flange with the respective housing inserted through the insertion hole.

4. The multiple spindle processing unit according to claim 3, wherein:
   some of the tool assemblies are mounted to the frame member with the flange in close contact with one side surface of the frame member; and
   the other tool assemblies are mounted to the frame member with the flange in close contact with the other side surface of the frame member.

5. The multiple spindle processing unit according to claim 3, wherein the flange is formed to protrude from the housing on diametrically opposed sides.

* * * * *